(12) United States Patent
Goldstein et al.

(10) Patent No.: US 10,440,964 B2
(45) Date of Patent: Oct. 15, 2019

(54) SYSTEM FOR MANUFACTURING AN EDIBLE FOOD PRODUCT CONTAINER

(71) Applicant: Conewich Enterprises Limited Partnership, Escondido, CA (US)

(72) Inventors: Ward J. Goldstein, Simi Valley, CA (US); Richard E. Ball, Jr., Escondido, CA (US)

(73) Assignee: CONEWICH ENTERPRISES LIMITED PARTNERSHIP, Escondido, CA (US)

( * ) Notice: Subject to any disclaimer, the term of this patent is extended or adjusted under 35 U.S.C. 154(b) by 0 days.

(21) Appl. No.: 15/821,818

(22) Filed: Nov. 23, 2017

(65) Prior Publication Data

US 2018/0092369 A1     Apr. 5, 2018

Related U.S. Application Data

(63) Continuation of application No. 14/587,397, filed on Dec. 31, 2014, now abandoned.

(60) Provisional application No. 61/930,783, filed on Jan. 23, 2014.

(51) Int. Cl.

| | |
|---|---|
| *A21C 3/06* | (2006.01) |
| *A21D 13/33* | (2017.01) |
| *A21B 5/02* | (2006.01) |
| *A21C 15/02* | (2006.01) |
| *A21C 11/00* | (2006.01) |

(52) U.S. Cl.
CPC .............. *A21D 13/33* (2017.01); *A21B 5/026* (2013.01); *A21C 3/06* (2013.01); *A21C 11/00* (2013.01); *A21C 15/025* (2013.01)

(58) Field of Classification Search
CPC ......... A21C 3/06; A21C 3/065; A21C 15/025; A21C 11/00; A21B 5/026; A21D 8/02; A21D 13/0029; A21D 13/33
USPC ......................................... 425/319, 391, 334
See application file for complete search history.

(56) References Cited

U.S. PATENT DOCUMENTS

| | | | | |
|---|---|---|---|---|
| 1,332,590 | A | * | 3/1920 | Paul ..................... A21C 15/025 425/334 |
| 1,337,500 | A | * | 4/1920 | Paul ........................ A21B 5/02 425/334 |
| 1,720,304 | A | * | 7/1929 | Taylor .................. A21C 15/025 425/214 |

(Continued)

FOREIGN PATENT DOCUMENTS

| | | |
|---|---|---|
| WO | WO-1998-048632 | 11/1998 |
| WO | WO-2003-077659 A1 | 9/2003 |

*Primary Examiner* — Seyed Masoud Malekzadeh
(74) *Attorney, Agent, or Firm* — Douglas Denninger

(57) ABSTRACT

An automated system and method for manufacturing a cone-shaped food product holder requires the coordinated use of a forming unit, a conveyor unit and a control unit. In their combination, the forming unit rotates a conically-shaped bake form at a constant angular velocity ω. Simultaneously, the conveyor unit advances a bread dough strip on a conveyor belt at a constant linear velocity v, for deposit of the bread dough strip onto the bake form. In order to account for the conical configuration of the bake form, the actions of the forming unit and the conveyor unit are coordinated by the control unit. Specifically, the control unit moves the conveyor unit with a predetermined rotation relative to the forming unit to form the food product holder on the forming unit for subsequent baking.

15 Claims, 2 Drawing Sheets

(56) References Cited

U.S. PATENT DOCUMENTS

| | | | |
|---|---|---|---|
| 1,906,640 A * | 5/1933 | Bernard | A21B 5/026 425/422 |
| 1,920,650 A * | 8/1933 | Abraham | A21C 15/025 425/334 |
| 3,410,691 A | 11/1968 | Stanley | |
| 4,150,935 A * | 4/1979 | Venzo | A21C 3/065 425/305.1 |
| 4,624,855 A * | 11/1986 | Haas, Sr. | A21C 15/025 426/138 |
| 4,761,293 A * | 8/1988 | Herting | A21B 5/026 426/139 |
| 4,776,265 A | 10/1988 | Ojima | |
| 4,795,652 A | 1/1989 | Cooper | |
| 4,801,259 A * | 1/1989 | van der Hoorn | A21C 3/065 425/305.1 |
| 4,842,879 A * | 6/1989 | Ek | A21C 3/065 425/373 |
| 5,626,897 A * | 5/1997 | Goldstein | A21B 5/026 426/138 |
| D388,236 S | 12/1997 | Goldstein | |
| 5,753,292 A * | 5/1998 | Haas | A21B 5/026 425/417 |
| 6,227,103 B1 * | 5/2001 | Haas, Sr. | A21C 15/025 99/354 |
| 7,344,371 B2 * | 3/2008 | Shinomiya | A21B 5/026 425/348 R |
| 2002/0187236 A1 | 12/2002 | Kaiser | |
| 2008/0220132 A1 | 9/2008 | Taminich | |

\* cited by examiner

SYSTEM FOR MANUFACTURING AN EDIBLE FOOD PRODUCT CONTAINER

This application is a continuation of U.S. Non-Provisional application Ser. No. 14/587,397 filed Dec. 31, 2014, now abandoned which claims the benefit of U.S. Provisional Patent Application No. 61/930,783, filed Jan. 23, 2014. The entire contents of each of the above-mentioned applications are hereby incorporated by reference herein.

FIELD OF THE INVENTION

The present invention pertains generally to systems and methods for the manufacture of edible holders for food products. More particularly, the present invention pertains to systems and methods for an automated mass production of food product holders for commercially viable purposes. The present invention is particularly, but not necessarily, useful as a system or method for commercially manufacturing cone-shaped food product holders that are made of bread.

BACKGROUND OF THE INVENTION

As is well appreciated in the business world, the commercialization of a product in the marketplace is dependent on two inseparable, but fundamentally different, factors. One factor concerns the product itself; i.e. is the product suitable for its intended purpose, and is it appealing to consumers. The other factor concerns whether the product can be profitably manufactured.

In the case of the present invention, the product of interest is an edible food container. In particular, this product is a bread cone as disclosed and claimed in U.S. Pat. No. 5,626,897 which issued to Goldstein on May 6, 1997, for an invention entitled Conical Food Article and Process for Making Same, which will be assigned to the same assignee as the present invention. The concern of the present invention, however, pertains to an automated process for the mass production of such a food product which will make the food product commercially viable.

Matters for concern in the mass production process for any product include quality control and manufacturing reliability, which are often collectively considered under the rubric of manufacturability. For a bread product such as is being considered here, an important manufacturing concern involves the handling of bread dough, as it is being formed into a desired shape prior to baking. Of particular concern in this process are the mechanical components of the system used for manufacture, and the interaction of these system components with uncooked bread dough during the manufacturing process.

With the above in mind, it is an object of the present invention to provide a system and method for reliably, repetitively, and continuously manufacturing a cone-shaped food product holder. Another object of the present invention is to provide a system and method for increasing the speed and productivity of manufacturing a cone-shaped food product holder. Still another object of the present invention is to provide a system and method for manufacturing a cone-shaped food product holder that is simple to implement, is easy to use, and is cost effective.

SUMMARY OF THE INVENTION

To create a food product in accordance with the present invention, an elongated strip of bread dough is first deposited along a spiral path on the external (outer) surface of a hollow, conical-shaped bake form. The bake form thus supports the food product during a baking process. Importantly, there is a partial overlap of the bread dough along the spiral path between successive windings. This overlap is established to a predetermined extent (e.g. 25%), and it is substantially constant during the deposit of bread dough onto the spiral path. The food product is then baked.

After baking has been completed, the food product is removed from the bake form. In its final form, the consumable food product is shaped as a hollow cone with an open base and a closed vertex. Importantly, it will have a bread crust that completely, and contiguously, covers both the inner surface and the outer surface. At this point the food product is ready for consumption.

Structurally, a bake form for use with the present invention is shaped as a hollow, right circular cone which defines an axis. The vertex tip of the bake form is removed to form a vent (for baking purposes) and the base of the bake form remains open. Additionally, a detent is formed along the periphery of the base, around the opening into the hollow of the bake form.

Dimensionally, the bake form will typically have a height of around 6.5 inches, with a base diameter of around 3.5 inches. The side of the bake form (i.e. its external surface) is tapered toward the axis at an inclination angle $\alpha$ of approximately 14°. The vent diameter at the vertex of the bake form is approximately 0.16 inches. Preferably, the bake form is made of a polyethersulfone resin.

For the manufacture of a food product, the bake form disclosed above is engaged with a mandrel. Like the bake form itself, the mandrel is conically-shaped. Unlike the bake form, however, the vertex end of the mandrel is blunt. With this structure the mandrel is dimensioned to be coaxially received into the hollow of the bake form. During this engagement, the outer surface of the mandrel is juxtaposed with the internal (inner) surface of the bake form.

In its structure, the mandrel includes two O-rings that are positioned on the outer surface of the mandrel. Both are oriented thereon in mutually parallel planes that are substantially perpendicular to the axis of the mandrel. In further detail, one of the O-rings is positioned to function as a base O-ring which engages with the detent that is formed around the base opening at the periphery of the bake form. The other O-ring, a support O-ring, is positioned intermediate the base O-ring and the blunt vertex end of the mandrel. In this combination, the base O-ring and the support O-ring stabilize the bake form on the mandrel during its engagement with the mandrel. Additionally, the mandrel includes a slip ring which is located adjacent the base O-ring, to position the base O-ring between the slip ring and the support ring. The slip ring can then be selectively moved in an axial direction toward the vertex end of the mandrel to disengage the bake form from the mandrel.

For the manufacture of a food product in accordance with the present invention, the bake form is operationally engaged with the mandrel, disclosed above. An elongated strip of bread dough is then deposited onto the outer surface of the bake form. Prior to baking, the strip of bread dough will have initial cross-section dimensions with a width w of about one and one-half inch, and a height h of about one-quarter inch. For the present invention, the strip of bread dough is deposited onto the bake form along a spiral path. As noted above, this is done with a partial overlap (e.g. one-quarter inch during each winding revolution). To complete the deposit process, after the bread dough strip has been deposited on the spiral pathway, the bread dough strip is pinched-off to seal or close the vertex end of the food product. The dough is now ready for additional preparations prior to baking the product. However, the bake form and the deposited dough strip are removed from the mandrel as one in order for them to be ready for the continuation of the dough preparations prior to baking the product. The preparation continues when one covers or completely washes down the dough covered bake form with a solution of baking soda, powdered corn starch and water. This solution helps to produce the golden brown appearance and also helps to seal the spiral of dough. The solution can be applied by spraying or having an agitated solution pouring over the products as they pass under the waterfall of solution.

Next, the product is ready to be placed into a proofer to allow the yeasted product to become warm, hydrated and completely sealed. Once the product has been fully proofed, it is now ready for the baking process which is performed in commercial steam injected ovens. The proofing of the product also assists the dough to rise on the bake form creating a thicker and tender bread texture of the bread cones.

As envisioned for the present invention, the deposition of bread dough on the bake form can be accomplished either manually or automatically. In either case, the resultant food product will be the same.

An apparatus for automatically depositing bread dough onto a bake form includes, in combination: a product forming unit; a conveyor unit; and a control unit. In this combination, the control unit coordinates the delivery of bread dough from the conveyor to the forming unit. In particular, this coordination requires synchronizing the linear movement of bread dough on the conveyor with the rotation of the bake form in the product forming unit. With this in mind, each unit of the apparatus is next considered seriatim.

The forming unit of the present invention essentially includes the bake form and the mandrel as disclosed above. Also included is a rotary drive motor which is connected to the mandrel for rotating the mandrel about the mandrel axis at a constant angular velocity $\omega$. In the forming unit, the axis of the mandrel is operationally inclined from a horizontal reference line by the inclination angle $\alpha$ of the bake form. As noted above, $\alpha$ is characteristic of the taper for both the mandrel and the bake form. Thus, in operation, when the bake form is engaged with the mandrel and is rotated by the rotary drive motor, there will always be a line on the external (outer) surface of the bake form that is horizontally oriented between the base of the bake form and the vertex of the bake form.

The conveyor unit of the present invention includes an elongated channel having a proximal end and a distal end. It is approximately two meters in length, and it has a conveyor belt that runs through the length of the channel. A pivot at the proximal end of the conveyor channel is provided to rotate the conveyor channel through an angle $\theta$ in a horizontal plane around the pivot point. With such rotation, the distal end of the conveyor channel moves through an arc length $l_{arc}$. In the case of the present invention, the required total $l_{arc}$ will typically be less than about 25 mm (i.e. the height of the food product being manufactured). Consequently, due to the relatively longer conveyor channel (e.g. 2 m) in comparison with the much shorter arc length required for the present invention (e.g. 25 mm), $l_{arc}$ can be considered to be a straight line. Moreover, using small angle approximations (i.e. sin $\theta$=$\theta$), $l_{arc}$ can be estimated to be equal to $\theta$ radians. As intended for the present invention the bread dough strip will be advanced by the conveyor belt at a constant velocity v. Also included with the conveyor unit is a follower arm which is attached to, or is mounted on, the conveyor channel for interaction with the control unit as disclosed below.

For the present invention, the control unit includes a cam, and it has a drive motor for rotating the cam about a cam axis through an angle $\phi$. In detail, the cam is engineered so that a distance R, which is measured between the cam axis and the edge of the cam, will vary depending on the particular angle $\phi$ on the cam axis at which R is measured. Thus R is variable and accordingly, dynamic changes in $\phi$ will determine corresponding changes in R. Mathematically stated, $dR/d\phi$ is variable, and it will be determined by the geometric curve that is established for the edge of the cam. As a practical matter, this geometric curve can be empirically determined based on the dimensions and characteristics of the particular bake form being used. In the event, the edge of the cam interacts directly with the follower arm on the conveyor unit to move the conveyor channel. As a consequence, a change in arc length ($\Delta l_{arc}$) is determined by the geometric curve of the cam edge ($\Delta l_{arc} \sim dR/d\phi$).

In an automated operation of the present invention the bake form is positioned on (i.e. engaged with) the mandrel. The rotary drive motor for the mandrel then rotates the mandrel at the constant angular velocity $\omega$. Simultaneously, the conveyor moves the bread dough strip through the conveyor channel at the constant linear (translational) velocity v. All the while, the cam is also being rotated. Specifically, the cam is rotated to provide the predetermined progression of $dR/d\phi$ that is empirically engineered for the geometric curve along the edge of the cam. Then, due to the interaction of the follower arm on the conveyor unit with the edge of the rotating cam, the distal end of the conveyor will be moved through the arc length $l_{arc}$ in a predetermined manner. As intended for the present invention, this movement must account for the taper of the external (outer) surface of the bake form, and the constant angular velocity $\omega$ of the bake form, as the bread dough strip is being deposited from the conveyor unit onto the bake form.

At the end of a wrapping duty cycle, the angular velocity $\omega$ can be abruptly increased. The intent here is to tear and pinch the bread dough strip coming from the conveyor, and to thereby separate bread dough already deposited on the bake form from bread dough being advanced by the conveyor. The increased w will also help close off (i.e. pinch) the vertex of the food product. The slip ring on the mandrel can then be activated to disengage the bake form from the mandrel, while still supporting the bread dough, so the bread dough can be baked while it is being supported by the bake form.

In a typical operation of the system (apparatus) for the present invention, the bake form may be rotated as many as five or more times during a duty cycle. The number of rotations will determine the number of windings (one winding per rotation of the bake form) for the final food product. On the other hand, the cam is rotated through only one 360° rotation during a complete duty cycle. Further, a distance r, which is the distance between the rotational axis of the mandrel (bake form) and a point on the external surface of the bake form where bread dough is being deposited onto the bake form, will vary during a duty cycle because of the taper of the bake form. Thus, both r (bake form) and R (cam) will vary during a duty cycle. These variations (changes) must be reconciled.

With the above in mind, consider a complete duty cycle for r and R. At the beginning of a duty cycle approximately 80% of the first winding r will not change (i.e. r is constant and dr/dt=0). Likewise, during this time, R on the cam will also be constant and $dR/d\phi=0$. Thereafter, however, for subsequent windings of dough onto the bake form during a duty cycle (e.g. windings two through five), R of the cam will change (i.e. increase) in accordance with the geometric curve for the edge of the cam and $dR/d\phi$ will correspondingly have a value. As R changes (i.e. it gets bigger), r will also change (i.e. it gets smaller). With these changes, the time rate of change for $\Delta l_{arc}$ (i.e. $d\Delta l_{arc}/dt$) will necessarily trend with $dR/d\phi$ by increasing during the duty cycle.

From another perspective, the present invention relates to a conically-shaped edible food article and to a process for making such article.

There are a number of common articles of food which are formed in a conical shape. One of the best known of these is the conical ice cream cone, which is generally formed by pouring liquid waffle dough into a mold or else forming a single sheet of dough into a cone shape. These types of dough form rigid brittle shells.

U.S. Pat. No. 3,410,691 of Stanley.
U.S. Pat. No. 4,795,652 of Cooper.
U.S. Pat. No. 5,626,897 of Goldstein.

Pizza Cones—pressed dough is poured into a conical form and another conical form is inserted into the wet dough and the remainder of the dough is cut away at the wide end. The dough is partially baked in the form and then is removed to be packed and frozen. The product can then be shipped to end users to finish the baking of the cone with fillings placed into them. The finished product comes out as a crispy filled cone-shaped pizza. These cones tend to have a diameter at the wide end of about 2-inches and consumers tend to bite over the diameter of the cone for consumption negating the advantage of serving foods in a conical-shaped article. They have a special machine that heats the products with fillings for about 2 to 4 minutes.

Crispy Cones—Also involve pushing or pressing dough formulations into a conical cavity and inserting another conical form to displace the dough formulation and allowing for the end product to be a conical-shaped food article. It too is partially or can be completely baked in the machine form. Then it can be removed frozen and delivered empty to the customers to fill them with foods and finish the baking of the product with the fillings inside the cone. These cones tend to be more cereal based as opposed to being yeasted dough formulations of bread dough. This is why they tend to be very thin, crisp and brittle like waffle ice cream cones.

All have lacked the quality of producing a freshly baked bread conical-shaped container with the exception of Goldstein's Conewich® bread cones.

It is the object of the present invention to provide a new and improved food article and process for making such an article.

According to one aspect of the present invention, a food article is provided which comprises a conical receptacle of soft bread dough formed by wrapping a strip of uncooked bread dough spirally around a conical mandrel starting at the widest end of the mandrel to form a plurality of successive spiral turns of the dough strip with an overlap between adjacent turns and adjacent turns adhered to one another by baking to form a contiguous conical structure of a hollow interior for receiving an edible filling.

According to another aspect of the present invention, a process for making such a food article is provided which comprises the steps of forming a continuous, elongated strand of bread dough, winding the strand spirally around a conical mandrel starting at the widest end of the mandrel to form a plurality of adjacent spiral turns with an overlap between adjacent turns and curing and cooking the wrapped spiral strand on the mandrel to form a conical receptacle of soft bread consistency.

Preferably, the strand is a flat strip and is wrapped with an overlap of around ⅓ to ½ the width of the strip between adjacent turns of the strip so that the overlapping portions of the adjacent turns will adhere to each other to form a sealed, integral conical receptacle.

This food receptacle can be made conveniently and economically and can be filled with a variety of foods and eaten while being hand-held. Since a soft, bread dough cone is formed, it can be used as a sandwich bread substitute which is particularly convenient and advantageous since it avoids the problems of any filling spilling from the sides of a sandwich.

This food receptacle can be made by hand or by automated methods. The bread dough itself can be formed in a number of different ways to produce the finished flat strand of dough that can be spirally formed onto the conical mandrel bake forms. When made by hand, a person would wrap the dough strip onto the bake form and this same method can be used by motorizing the spinning motion to allow for the faster winding of the dough onto the bake form. Automation of this process allows for any number of winding heads to be presented with the appropriately formed dough strips to be applied to the bake forms, allowing whatever number of bread cones to be wound simultaneously and thus reducing the number of persons necessary for this operation of the bread cone production process.

The commercial aspects of these conically-shaped bread containers can be made in all different sizes and with all different types of bread dough formulations. They can be fully baked or partially baked before being removed from the mandrel bake forms. Even the bake form material can reliably produce these cones with different consistencies.

When the dough is baked on spun aluminum bake forms, the finished bread cones are firmly baked and are comprised of a crispier texture. When the dough is baked on a variety of bake temperature resin bake forms, the finished cones are fully baked and yet retain a far more fully flexible bread cone. Some of these bake temperature resin bake forms also include advantages of needing far less pan release for assisting in the removal of the bread cone from the bake form. It has been found that the bake temperature resin bake forms produce a superior bread cone because the resin bake form heats up more slowly and retains the moisture from the proofing and baking process more effectively than what is possible when baking on the spun aluminum or other metal bake forms, even when all of the bake forms are shaped the same and each have the identical opening in the apex of the form for the moisture to escape.

To produce the partially baked bread cones, one only has to do all the normal procedures for making bread cones that would be used for a fully baked product with the one exception of removing the bread cones from the oven just after the narrower half of the bread cone is golden brown and while the wider half of the bread cone remains white in appearance. This allows the bread cones to retain their shape even after they are removed from the bake form. Once cooled, they can be bagged and frozen just like fully baked bread cones.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
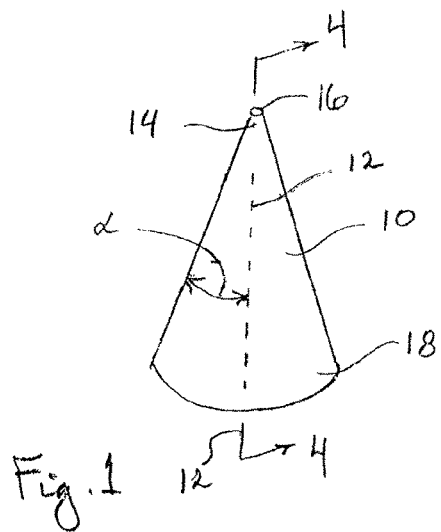
FIG. 1 is a perspective view of a bake form in accordance with the present invention.
Figure 2:
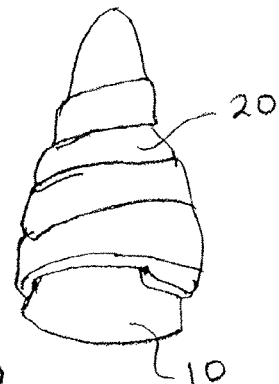
FIG. 2 is a view of the bake form shown in FIG. 1 while supporting a food product envisioned for manufacture by the present invention.

Referring initially to FIG. 1 a conical-shaped bake form in accordance with the present invention is shown and is designated 10. As shown, the bake form 10 defines an axis 12, and it has a vertex tip end 14 that is formed with a vent 16. The base end 18 of the bake form 10 is dimensioned relative to its tip end 14 to establish a taper for the bake form 10 which is defined by the angle $\alpha$. As envisioned for the present invention, the angle $\alpha$ will be approximately 14°. In FIG. 2, a food product holder 20, such as is to be manufactured in accordance with the present invention, is shown positioned on a bake form 10. In particular, the food product holder 20 is shown after its manufacture (i.e. after being baked), and prior to its removal from the bake form 10.

Figure 3:
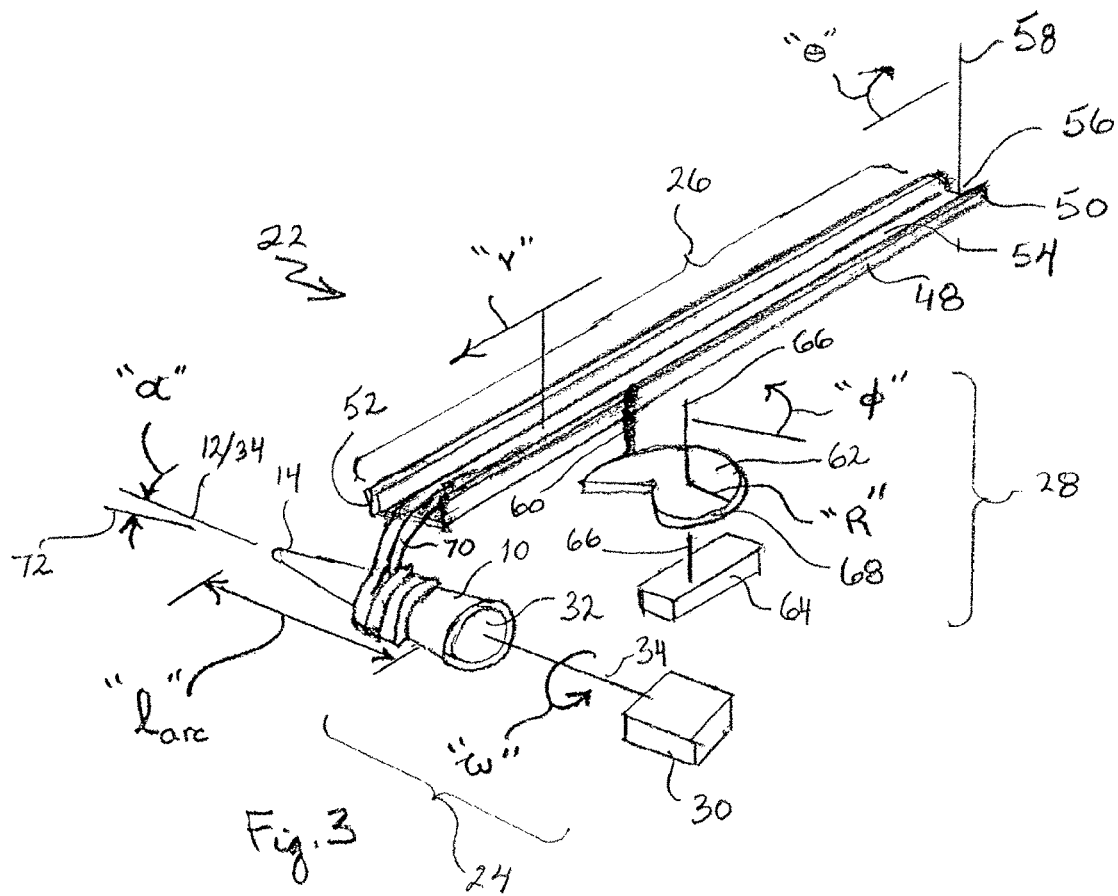
FIG. 3 is a schematic presentation of interactive components in an automated system of the present invention for manufacturing a food product.

In FIG. 3, a system for manufacturing a food product holder 20 in accordance with the present invention is shown, and is generally designated 22. As shown, the system 22 includes a forming unit 24, a conveyor unit 26 and a control unit 28. In combination, the units 24, 26 and 28 cooperate with each other to manufacture a successive plurality of individual food product holders 20. In particular, as intended for the present invention, the automated system 22 is provided to continuously manufacture food product holders 20 on an uninterrupted schedule.

With specific reference to the forming unit 24 in FIG. 3, it will be appreciated that this forming unit 24 includes a rotary drive motor 30 which is coupled with a mandrel 32. Further, it is to be appreciated that the bake form 10 can be mounted onto the mandrel 32, as shown. In this combination, the present invention intends for the rotary drive motor 30 to rotate the mandrel 32 with bake form 10, together, at a constant angular velocity $\omega$ about the mandrel axis 34.

Figure 4:
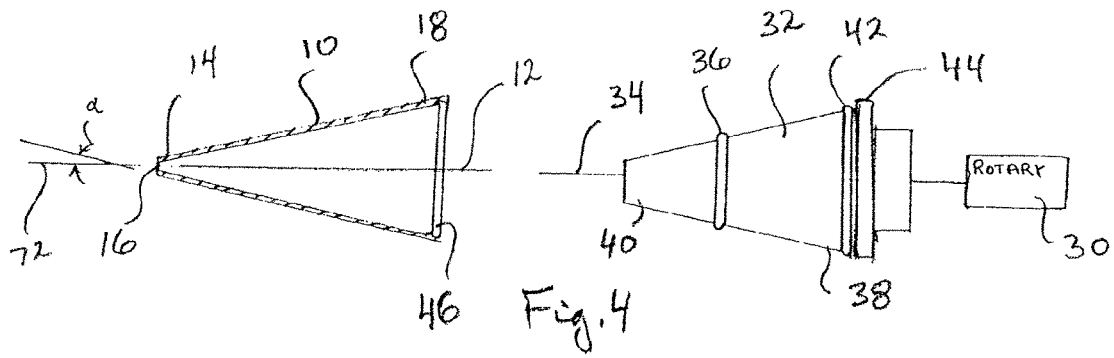
FIG. 4 is an exploded view of a forming unit in accordance with the present invention (i.e. a bake form, a mandrel, and a rotary drive), wherein the bake form is shown in cross-section as would be seen along the line 4-4 in FIG. 1.

This combination of bake form 10 and the mandrel 32 will be best appreciated with reference to FIG. 4. There it will be seen that the mandrel 32 includes a support O-ring 36 which is located approximately midway between the proximal end 38 and the distal end 40 of the mandrel 32. Also, FIG. 4 shows that the mandrel 32 includes a slip ring 44, and that the bake form 10 is formed with a detent 46 at its base end 18. With these structural aspects in mind, it is to be appreciated that the mandrel 32 is dimensioned to receive the bake form 10. When the bake form 10 is combined with the mandrel 32, the detent 46 of the bake form 10 is engaged with the base O-ring 42 of the mandrel 32, and the support O-ring 36 of the mandrel 32 is positioned to support and stabilize the bake form 10 on the mandrel 32. A separation of the bake form 10 from the mandrel 32 is then caused by a selective manipulation that moves the slip ring 44 in a proximal direction on the mandrel 32.

Referring back to FIG. 3 it will be seen that the conveyor unit 26 of the system 22 includes a conveyor channel 48 that has a proximal end 50 and a distal end 52. FIG. 3 also shows that a conveyor belt 54 is mounted on the conveyor channel 48. More specifically, the conveyor belt 54 is mounted for linear movement through the conveyor channel 48 from the proximal end 50 toward the distal end 52 of the conveyor channel 48, at a constant linear velocity v. Further, it is indicated in FIG. 3 that the conveyor channel 48 is intended to be rotated through an angle $\theta$, about a pivot point 56 on a vertical axis 58, at the proximal end 50 of the conveyor channel 48. Additionally, the conveyor unit 26 includes a follower arm 60 that is fixedly mounted on the conveyor channel 48 for movement therewith.

Still referring to FIG. 3, it will also be seen that the control unit 28 includes a cam 62 that is rotated by a drive motor 64 through an angle $\Phi$ around a cam axis 66. Further, the cam 62 has an edge 68 that is located at a distance R from the cam axis 66. As shown in FIG. 3, the distance R is variable and its value at any point in time is dependent on the angle $\Phi$. Mathematically stated, $dR/d\Phi$ is variable. Another feature of the system 22 is that the conveyor channel 48 is biased to continuously urge the follower arm 60 against the edge 68 of cam 62.

Figure 5:
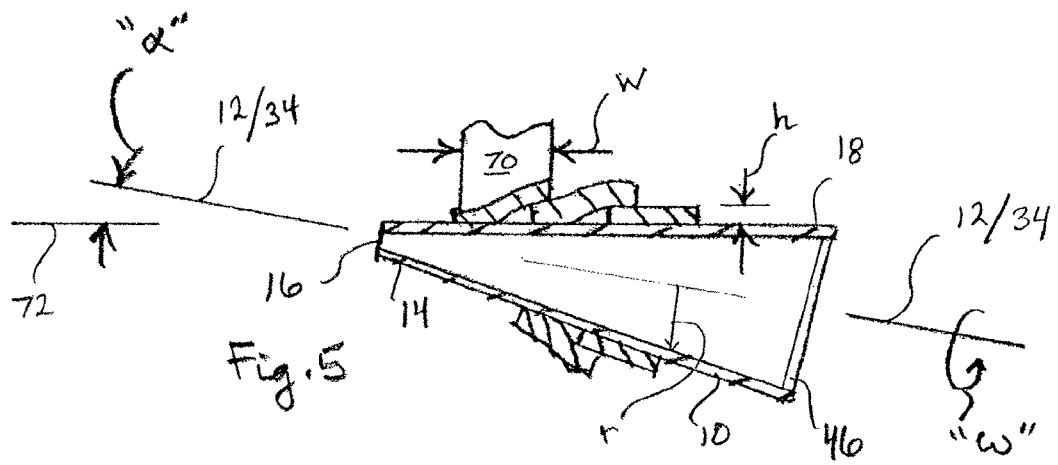
FIG. 5 is a cross-section view of the bake form as seen in FIG. 4 with a bread dough strip deposited on the outer surface of the bake form.

For an operation of the present invention, the system 22 will repetitively perform a succession of duty cycles. During each duty cycle, the drive motor 64 will rotate the cam 62 through an angle $\Phi$ of 360°. Recall: the conveyor channel 48 is biased to continuously urge the follower arm 60 against the edge 68 of cam 62. Thus, as the cam 62 turns, it will push against the follower arm 60. In turn, this interaction between the cam 62 and the follower arm 60 will cause the distal end 52 of conveyor channel 48 to travel through the arc length $l_{arc}$. At the same time, the rotary drive motor 30 is rotating the bake form 10 at an angular velocity $\omega$. Moreover, during all of this, the conveyor belt 54 is also advancing a bread dough strip 70 through the conveyor unit 26 at a velocity v, to deposit the bread dough strip 70 on the bake form 10. As shown in FIG. 5, a coaxial 12/34 alignment of the bake form 10 (axis 12) and mandrel 32 (axis 34) is inclined at the angle $\alpha$ relative to a horizontal line 72 to present a horizontal portion, of the bake form 10 for the deposit of bread dough strip 70 on the bake form 10. Stated differently, in this orientation, the horizontal portion of bake form 10, the travel arc, $l_{arc}$, for the movement of distal end 52 of the conveyor channel 48, and the horizontal line 72, are all essentially, mutually parallel.

Figure 6:
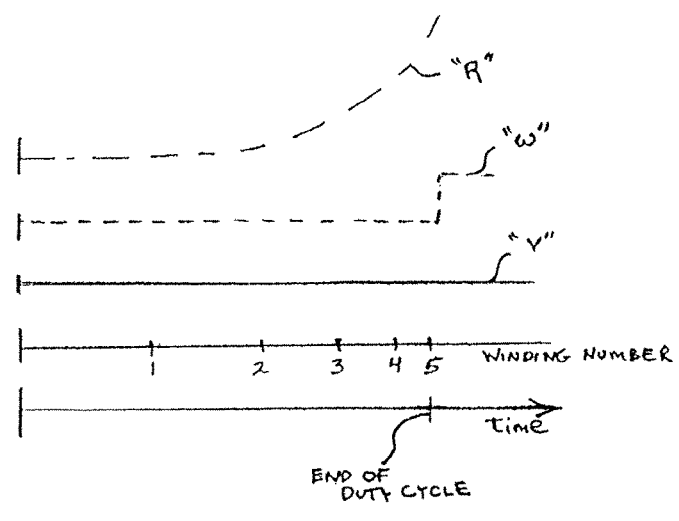
FIG. 6 is a graphical presentation of time variations in operational parameters during a duty cycle in the operation of the present invention.

With the above in mind, and with reference to FIG. 6, it will be appreciated that the variable distance R (which is dependent on a rotation of the cam 62), the constant angular velocity $\omega$ (which is established for rotation of the bake form 10), and the constant linear velocity v (which is established for the conveyor belt 54) are all interdependent and must be controlled. The important consequence of all this is the time required to deposit the bread dough strip 70 on the bake form 10. FIG. 6 shows an exemplary duty cycle during which five windings of a bread dough strip 70 are deposited onto the bake form 10. Note: by cross-referencing FIGS. 5 and 6, it will be appreciated that as the radius r of the bake form 10 decreases, the time to complete a winding of the bread dough strip 70 on the bake form 10 will likewise decrease.

It is also noteworthy that at the end of a duty cycle, but before the start of the next duty cycle, the rotational velocity ω of the bake form 10 can be momentarily increased (see FIG. 6) to pinch the bread dough strip 70 from the newly formed food product holder 20.

In a briefly summarized overview, a method for manufacturing a food product holder 20 in accordance with the present invention involves first orienting the conical-shaped mandrel 32 with its mandrel axis 34 inclined in a vertical plane at an angle α relative to a coplanar horizontal line 72. Next, the conical-shaped bake form 10 is engaged with the mandrel 32 in a coaxial 12/34 alignment that orients a portion of the bake form 10 parallel to the horizontal line 72 during a rotation of the bake form 10 on the mandrel 32 at the constant angular velocity ω. Additionally, a conveyor channel 48 having a proximal end 50 and a distal end 52 is rotated through an angle θ in a horizontal plane around the pivot point 56, to move the distal end 52 of the conveyor channel 48 along an arc length $l_{arc}$ relative to the bake form 10. Within this cooperation of structure, a cyclical rotation of the conveyor channel 48 through the angle θ results in a consequent cyclical translation of the distal end 52 of the conveyor channel 48 through the arc length $l_{arc}$. Importantly, this is controlled by the control unit 28 to coordinate the translation of the distal end 52 of the conveyor channel 48 with the rotation of the conical-shaped bake form 10. All of this, of course, is accomplished while the bread dough strip 70 is advanced by the conveyor belt 54 along the conveyor channel 48. The result is that the bread dough strip 70 is deposited from the distal end 52 of the conveyor channel 48 onto the rotating bake form 10 to form the food product holder 20.

While the particular Bake Form for Manufacturing a Food Product as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for manufacturing an edible food product container formed by winding a strip of uncooked bread dough, the system comprising:
   a bake form made of a bake temperature resin, wherein the resin bake form is shaped as a hollow, right circular cone defined by a vertex, and a base, and an axis, and wherein a portion of the cone at the vertex is removed to form a vent on the bake form and the base of the cone remains open to provide access into the hollow of the bake form, and further wherein a detent is formed along a periphery around the open base;
   a conveyor unit configured to deliver the strip of uncooked bread dough to the bake form prior to baking;
   a control unit configured to coordinate the delivery of the strip of bread dough from a distal end of the conveyor unit to the bake form at a constant partial overlap along a spiral pathway on an external surface of the bake form to a predetermined extent during winding of the strip of bread dough to shape the food product container;
   a conically-shaped mandrel having an outer surface, wherein the mandrel is dimensioned to be coaxially received into the hollow of the bake form to juxtapose the outer surface of the mandrel with an internal surface of the bake form in the hollow of the bake form; and
   a mechanism configured to rotate the mandrel, together with the bake form, while the strip of bread dough is deposited along the spiral pathway on the external surface of the bake form to prepare the food product container for baking as a conical-shaped food product container wherein, after baking, the spirally deposited strip of bread dough is a baked bread conical-shaped food product container, wherein the mechanism configured to rotate includes a rotary drive motor, wherein the rotary drive is connected to the mandrel for rotating the mandrel in combination with the bake form about the mandrel axis at a constant angular velocity ω to deposit the strip of bread dough along the spiral pathway on the external surface of the bake form to prepare the food product container for baking, and wherein the system is configured to wind the strip of bread dough in successive overlapped spiral turns from the base to the vertex of the bake form.

2. The system as recited in claim 1 wherein the mandrel further comprises:
   a base O-ring positioned on the mandrel for engagement with the detent around the base opening of the bake form; and
   a support O-ring positioned on the mandrel at a distance from the base O-ring for cooperation with the base O-ring to stabilize the bake form on the mandrel during an engagement of the mandrel with the bake form during winding of the strip of bread dough on the external surface of the bake form.

3. The system as recited in claim 2 further comprising a slip ring mounted on the mandrel, wherein the slip ring can be moved in an axial direction on the mandrel to disengage the bake form from the mandrel prior to baking the spirally deposited strip of bread dough.

4. The system as recited in claim 1 wherein the bake form has a height of 6.5 inches, with a base diameter of 3.5 inches, and the external surface of the bake form is tapered toward the axis of the bake form at an inclination angle α of 14°, and further wherein the vent diameter of the bake form is 0.16 inches.

5. The system as recited in claim 1 wherein the strip of bread dough has cross-section dimensions, prior to baking, with a width w of one and one-half inch, and a height h of one-quarter inch, and wherein the bread dough strip is deposited onto the external surface of the bake form along the spiral path with the partial overlap in a range of one-quarter inch to three-quarters of an inch.

6. The system as recited in claim 1 wherein the conveyor unit comprises:
   an elongated conveyor channel having a proximal end and a distal end with a length therebetween;
   a conveyor belt that runs through the length of the conveyor channel; and
   a pivot at the proximal end of the conveyor channel to rotate the conveyor channel through an angle θ in a horizontal plane around the pivot point to move the distal end of the conveyor channel through an arc length $l_{arc}$ to deposit the strip of bread dough at the constant partial overlap along the spiral pathway on the external surface of the bake form to prepare the food product container for baking.

7. The system as recited in claim 6 wherein the control unit comprises:
   a cam defining a cam axis and having an edge, wherein the edge of the cam is engineered with a variable distance R, wherein R is measured between the cam axis and the edge of the cam and is dependent on an angle φ around the cam axis where R is measured, and wherein variations in R with changes in φ establish a predetermined geometric curve for the edge of the cam; and a drive motor for rotating the cam about the cam axis with dynamic changes in φ determining corresponding changes in R, and wherein the edge of the cam interacts directly with the conveyor unit to move the conveyor channel under influence of the geometric curve at the edge of the cam to deliver the strip of bread dough to the bake form at the constant partial overlap.

8. The system as recited in claim 1 wherein the food product container is formed by the system to have a bread crust that completely and contiguously covers the outer surface of the food product container.

9. The system as recited in claim 1 wherein the food product container is formed by the system to be flexible and non-rigid after removal from the bake form.

10. The system as recited in claim 1 wherein the control unit coordinates delivery of the strip of bread dough to achieve a plurality of successive overlapped spiral turns of the bread dough on the external surface of the bake form.

11. The system as recited in claim 10 wherein the bread dough is delivered to form a contiguous, sealed, integral, conical food product container after baking and after removal from the bake form.

12. The system of claim 1 further including the strip of uncooked bread dough.

13. The system of claim 1 wherein the mandrel is operationally inclined to present a portion of the bake form to be parallel to the distal end of the conveyor unit for deposit of the bread dough on the external surface of the bake form.

14. A system for manufacturing an edible food product container formed by winding a strip of uncooked bread dough, the system comprising:

a bake form made of a bake temperature resin, wherein the resin bake form is shaped as a hollow, right circular cone defined by a vertex, and a base, and an axis, and wherein a portion of the cone at the vertex is removed to form a vent on the bake form and the base of the cone remains open to provide access into the hollow of the bake form, and further wherein a detent is formed along a periphery around the open base;

a conveyor unit configured to deliver the strip of uncooked bread dough to the bake form prior to baking, the conveyor unit including: (i) an elongated channel having a proximal end and a distal end with a length therebetween; (ii) a conveyor belt that runs through the length of the channel; and (iii) a pivot at the proximal end of the conveyor channel to rotate the conveyor channel through an angle θ in a horizontal plane around the pivot point to move the distal end of the conveyor channel through an arc length $l_{arc}$ to deposit the strip of bread dough at a constant partial overlap along a spiral pathway on an external surface of the bake form to a predetermined extent to prepare the food product container for baking;

a control unit configured to coordinate the delivery of the strip of bread dough from the conveyor unit to the bake form during winding of the strip of bread dough to shape the food product container, the control unit including (1) a cam defining a cam axis and having an edge, wherein the edge of the cam is engineered with a variable distance R, wherein R is measured between the cam axis and the edge of the cam and is dependent on an angle φ around the cam axis where R is measured, and wherein variations in R with changes in φ establish a predetermined geometric curve for the edge of the cam; and (2) a drive motor for rotating the cam about the cam axis with dynamic changes in φ having corresponding changes in R, and wherein the edge of the cam interacts directly with the conveyor unit to move the conveyor channel under influence of the geometric curve at the edge of the cam to deliver the strip of bread dough to the bake form at the constant partial overlap;

a conically-shaped mandrel having an outer surface and operationally inclined to present a horizontal portion of the bake form for deposit of the bread dough, wherein the mandrel is dimensioned to be coaxially received into the hollow of the bake form to juxtapose the outer surface of the mandrel with an internal surface of the bake form in the hollow of the bake form; and a mechanism configured to rotate the mandrel, together with the bake form, while the strip of bread dough is deposited along the spiral pathway on the external surface of the bake form to prepare the food product container for baking as a conical-shaped food product container, wherein after baking the spirally deposited strip of bread dough is a baked bread conical-shaped food product container, wherein the mechanism configured to rotate includes a rotary drive motor, wherein the rotary drive is connected to the mandrel for rotating the mandrel in combination with the bake form about the mandrel axis at a constant angular velocity co to deposit the strip of bread dough along the spiral pathway on the external surface of the bake form to prepare the food product container for baking, and wherein the system is configured to wind the strip of bread dough in successive overlapped spiral turns from the base to the vertex of the bake form.

15. The system as recited in claim 14 further comprising a slip ring mounted on the mandrel, wherein the slip ring can be moved in an axial direction on the mandrel to disengage the bake form from the mandrel prior to baking the spirally deposited strip of bread dough.

* * * * *